(12) United States Patent
Kim et al.

(10) Patent No.: US 11,178,264 B2
(45) Date of Patent: Nov. 16, 2021

(54) MULTI-FOLDABLE ELECTRONIC DEVICE

(71) Applicant: Samsung Electronics Co., Ltd., Gyeonggi-do (KR)

(72) Inventors: Seonghoon Kim, Gyeonggi-do (KR); Minsung Lee, Gyeonggi-do (KR); Iksu Jung, Gyeonggi-do (KR); Minwoo Yoo, Gyeonggi-do (KR); Jongchul Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 23 days.

(21) Appl. No.: 16/872,922

(22) Filed: May 12, 2020

(65) Prior Publication Data
US 2020/0366770 A1 Nov. 19, 2020

(30) Foreign Application Priority Data
May 14, 2019 (KR) .................. 10-2019-0056552

(51) Int. Cl.
*H04M 1/02* (2006.01)
*G09G 5/14* (2006.01)

(52) U.S. Cl.
CPC ............ *H04M 1/0216* (2013.01); *G09G 5/14* (2013.01); *H04M 1/0241* (2013.01);
(Continued)

(58) Field of Classification Search
None
See application file for complete search history.

(56) References Cited

U.S. PATENT DOCUMENTS

| 9,588,549 B2 | 3/2017 | Endo et al. |
| 10,139,660 B2 | 11/2018 | Hirakata |

(Continued)

FOREIGN PATENT DOCUMENTS

| JP | 2020-106776 | 7/2020 |
| KR | 1020140090921 | 7/2014 |

(Continued)

OTHER PUBLICATIONS

International Search Report dated Aug. 11, 2020 issued in counterpart application No. PCT/KR2020/005996, 4 pages.

*Primary Examiner* — Quoc D Tran
(74) *Attorney, Agent, or Firm* — The Farrell Law Firm, P.C.

(57) ABSTRACT

An electronic device includes a foldable housing that includes a first hinge structure; a second hinge structure; a first housing structure including a first surface, a second surface facing away from the first surface, and a first side member surrounding a first space between the first surface and the second surface; a second housing structure including a third surface, a fourth surface facing away from the third surface, and a second side member surrounding a second space between the third surface and the fourth surface; a third housing structure including a fifth surface, a sixth surface facing away from the fifth surface, and a third side member surrounding a third space between the fifth surface and the sixth surface, wherein the first housing structure and the second housing structure are connected through the first hinge structure and the third housing structure are connected to the second housing structure through the second hinge structure, wherein through the first hinge structure, the second surface face the fourth surface in a folded state and the first surface and the third surface face in the same direction in an unfolded state, and wherein, through the second hinge structure, the third surface faces the fifth surface in the folded state and the third surface and the fifth surface face in the same direction in the unfolded state; and a flexible display extended from the first surface through the third surface to at least a portion of the fifth surface, wherein the second surface includes a recess whose vertical distance to the first surface is at least partially shorter than a vertical distance of a nearby site, and wherein the fourth surface (Continued)

includes a portion corresponding to the recess to make surface contact with the second surface.

25 Claims, 14 Drawing Sheets

(52) U.S. Cl.
CPC ....... *H04M 1/0262* (2013.01); *H04M 1/0264* (2013.01); *H04M 1/0268* (2013.01); *H04M 1/0277* (2013.01); *G09G 2340/0407* (2013.01)

(56) References Cited

U.S. PATENT DOCUMENTS

| | | | |
|---|---|---|---|
| 10,664,013 B2 | 5/2020 | Jiang et al. | |
| D913,282 S * | 3/2021 | Song | G06F 1/1652 D14/345 |
| 2007/0004475 A1 * | 1/2007 | Kuo | H04M 1/0214 455/575.3 |
| 2010/0201604 A1 * | 8/2010 | Kee | G06F 1/1641 345/1.3 |
| 2012/0314399 A1 * | 12/2012 | Bohn | G06F 1/1652 362/97.1 |
| 2014/0011548 A1 * | 1/2014 | Varela | H04M 1/0247 455/566 |
| 2015/0022436 A1 * | 1/2015 | Cho | G06F 3/147 345/156 |
| 2015/0227225 A1 | 8/2015 | Park et al. | |
| 2016/0085325 A1 | 3/2016 | Lee et al. | |
| 2017/0025634 A1 | 1/2017 | Jeong | |
| 2017/0293383 A1 * | 10/2017 | Lee | G06F 1/1641 |
| 2018/0358684 A1 | 12/2018 | Chun et al. | |
| 2020/0159287 A1 * | 5/2020 | Jeong | G06F 1/1652 |
| 2020/0192432 A1 * | 6/2020 | Yee | G06F 3/041 |
| 2020/0371553 A1 * | 11/2020 | Hsu | G06F 1/1652 |
| 2021/0216104 A1 * | 7/2021 | Huang | G06F 1/1681 |

FOREIGN PATENT DOCUMENTS

| | | |
|---|---|---|
| KR | 1020160034660 | 3/2016 |
| KR | 1020170048232 | 5/2017 |

* cited by examiner

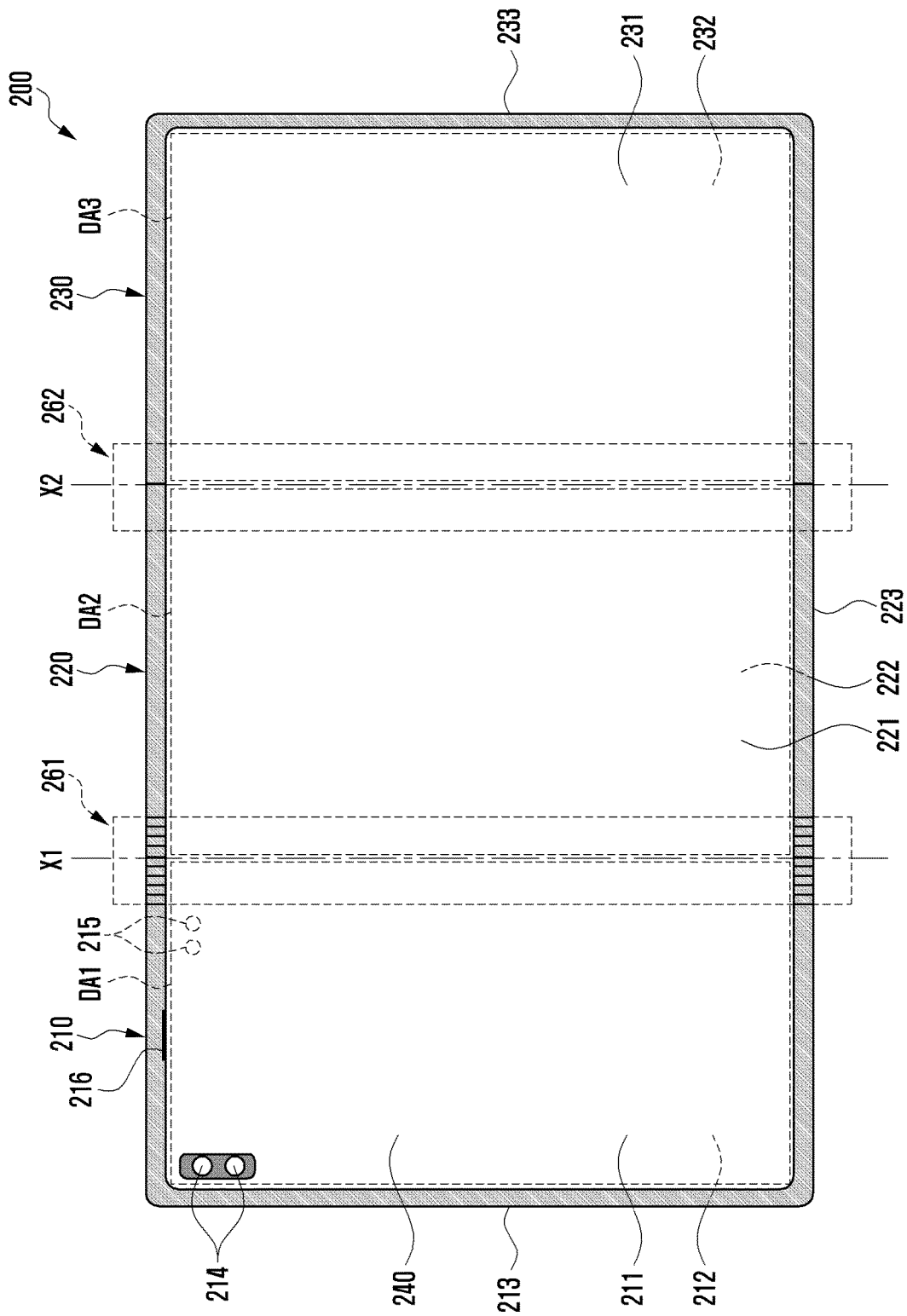

MULTI-FOLDABLE ELECTRONIC DEVICE

CROSS-REFERENCE TO RELATED APPLICATION(S)

This application is based on and claims priority under 35 U.S.C. § 119 to Korean Patent Application No. 10-2019-0056552, filed on May 14, 2019, in the Korean Intellectual Property Office, the disclosure of which is incorporated by reference herein in its entirety.

BACKGROUND

1. Field

The disclosure relates generally to a multi-foldable electronic device.

2. Description of Related Art

As the functional gap between manufacturers is reduced, electronic devices are becoming slimmer to meet consumer's purchasing needs. Also, electronic devices are being upgraded by increasing rigidity, enhancing design aspects, and differentiating their functional elements. These electronic devices having a uniform rectangular shape are gradually evolving into electronic devices having various shapes. For example, electronic devices may have an alterable structure that is highly portable and supports a large screen display when being used. In response to this trend, foldable electronic devices, which operate in a manner allowing plural housing structures to be folded relative to one another, are continuously developed, and various improvements are being made to solve the problem caused by the folding operation.

A multi-foldable electronic device may include plural housing structures that can be folded relative to one another to perform folding operations. The multi-foldable electronic device enables the use of a large screen display in the unfolded state, and its volume is reduced in the folded state to facilitate portability. Such a multi-foldable electronic device may include a first housing structure and a second housing structure foldably connected to each other through a first hinge structure in a first folding scheme (e.g., out-folding), and a third housing structure foldably connected to the second housing structure through a second hinge structure in a second folding scheme (e.g., in-folding). For example, when the first housing structure and the second housing structure are folded relative to each other in an out-folding manner, the display area may be exposed to outside of the electronic device. When the second housing structure and the third housing structure are folded relative to each other in an in-folding manner, the display areas may be folded to face each other. Hence, when the multi-foldable electronic device is folded, it may have a stacked structure where all the housing structures overlap each other, and various functions can be performed using the display seen from the first housing structure.

However, in the out-folding case where the display areas are disposed on the outer surface, two housing structures (e.g., first housing structure and second housing structure) may be folded to contact each other. In the in-folding case where the display areas are arranged to face each other, the display should be folded with a certain curvature (i.e., not completely folded) in the vicinity of the hinge structure. Due to this, two housing structures (e.g., the second housing structure and the third housing structure) may be folded so that one housing structure is eccentric with a certain angle with respect to the other housing structure. Because of this structure, the thickness of the multi-foldable electronic device may increase in the folded state. In addition, when the multi-foldable electronic device is placed on a cradle surface, as the display is disposed not to be parallel to the cradle surface, visibility may deteriorate.

SUMMARY

The present disclosure has been made to address the above-mentioned problems and disadvantages, and to provide at least the advantages described below.

In accordance with an aspect of the disclosure, an electronic device includes a foldable housing that includes a first hinge structure; a second hinge structure; a first housing structure including a first surface, a second surface facing away from the first surface, and a first side member surrounding a first space between the first surface and the second surface; a second housing structure including a third surface, a fourth surface facing away from the third surface, and a second side member surrounding a second space between the third surface and the fourth surface; a third housing structure including a fifth surface, a sixth surface facing away from the fifth surface, and a third side member surrounding a third space between the fifth surface and the sixth surface, wherein the first housing structure and the second housing structure are connected through the first hinge structure and the third housing structure is connected to the second housing structure through the second hinge structure, wherein, through the first hinge structure, the second surface faces the fourth surface in a folded state and the first surface and the third surface faces in the same direction in an unfolded state, and wherein, through the second hinge structure, the third surface faces the fifth surface in the folded state and the third surface and the fifth surface faces in the same direction in the unfolded state; and a flexible display extended from the first surface through the third surface to at least a portion of the fifth surface, wherein the second surface includes a recess whose vertical distance to the first surface is at least partially-shorter than that vertical distance of a nearby site, and wherein the fourth surface includes a portion corresponding to the recess to make surface contact with the second surface.

In accordance with another aspect of the disclosure, an electronic device includes a foldable housing that includes a multi joint hinge structure being outwardly foldable; a two-axis hinge structure being inwardly foldable; a first housing structure including a first surface, a second surface facing away from the first surface, and a first side member surrounding a first space between the first surface and the second surface; a second housing structure including a third surface, a fourth surface facing away from the third surface, and a second side member surrounding a second space between the third surface and the fourth surface; a third housing structure including a fifth surface, a sixth surface facing away from the fifth surface, and a third side member surrounding a third space between the fifth surface and the sixth surface, wherein the first housing structure and the second housing structure is connected through the multi-joint hinge structure and the third housing structure is connected to the second housing structure through the two-axis hinge structure, wherein, through the multi-joint hinge structure, the second surface faces the fourth surface in a folded state and the first surface and the third surface face in the same direction in an unfolded state, wherein, through the two-axis hinge structure, the third surface faces the fifth surface in the folded state and the third surface and the fifth surface face in the same direction in the unfolded state; and a flexible display extended from the first surface through the third surface to at least a portion of the fifth surface, wherein when both the multi-joint hinge structure and the two-axis hinge structure are folded, the first surface and the sixth surface are exposed to outside the electronic device, the first surface, the fifth surface and the sixth surface are arranged parallel to each other, and the first surface and the third surface are arranged not to be parallel to each other.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A is a view of a multi-foldable electronic device in the unfolded state, according to an embodiment;

DETAILED DESCRIPTION

Various embodiments of the disclosure provide a multi-foldable electronic device that can reduce a thickness in the folded state.

Various embodiments of the disclosure provide a multi-foldable electronic device that can secure excellent visibility when placed on a cradle surface in the folded state.

Figure 1:
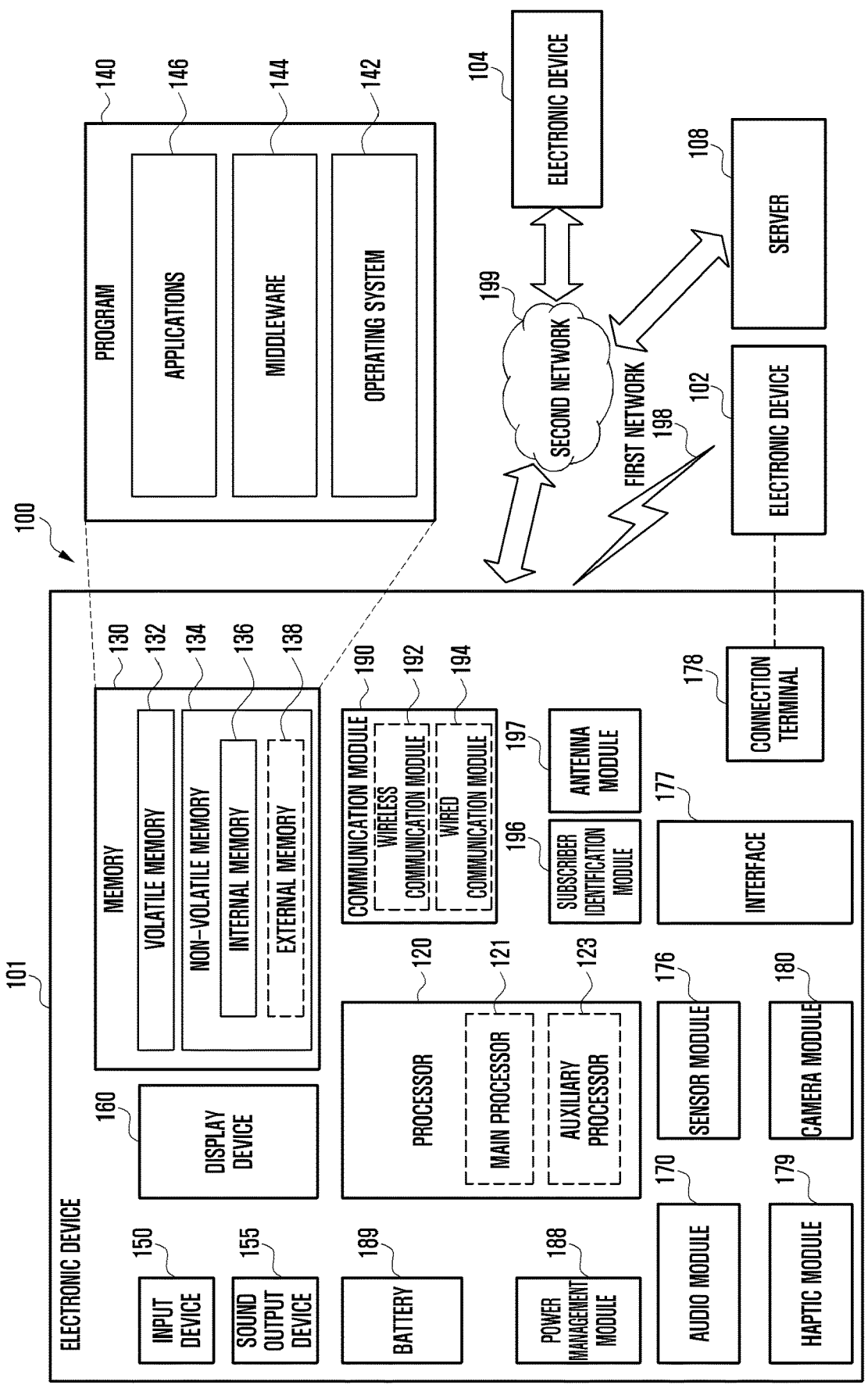
FIG. 1 is a block diagram of an electronic device in a network environment, according to an embodiment.

FIG. 1 is a block diagram illustrating an example electronic device in a network environment, according to an embodiment of the disclosure.

Referring to FIG. 1, in a network environment 100, an electronic device 101 may communicate with a first external electronic device 102 through a first network 198 (e.g., short-range wireless communication network) or may communicate with a second external electronic device 104 or a server 108 through a second network 199 (e.g., long-distance wireless communication network). In an example embodiment, the electronic device 101 may communicate with the second external electronic device 104 through the server 108. According to an embodiment, the electronic device 101 may include a processor 120, a memory 130, an input unit 150, a sound output unit 155, a display unit 160, an audio module 170, a sensor module 176, an interface 177, a haptic module 179, a camera module 180, a power management module 188, a battery 189, a communication module 190, a subscriber identification module 196, and an antenna module 197. In an example embodiment, at least one component (e.g., the display unit 160 or the camera module 180) among the components of the electronic device 101 may be omitted, or other components may be added to the electronic device 101. In an example embodiment, some of these components may be implemented as an integrated circuit. For example, the sensor module 176 (e.g., fingerprint sensor, iris sensor, or illuminance sensor) may be embedded in the display unit 160 (e.g., display).

The processor 120 may execute, for example, software (e.g., a program 140) to control at least one of other components hardware component or software component) of the electronic device 101 connected to the processor 120, and may process a variety of data or perform various computations. In an example embodiment, as part of data processing or computation, the processor 120 may load a command or data received from other components (e.g., the sensor module 176 or the communication module 190) into the volatile memory 132, process the command or data stored in the volatile memory 132, and store the result data in nonvolatile memory 134. In an example embodiment, the processor 120 may include a main processor 121 (e.g., central processing unit, or application processor), and a secondary processor 123 (e.g., graphics processing unit, image signal processor, sensor hub processor, or communication processor), which may operate independently of or in cooperation with the main processor 121. Additionally or alternatively, the secondary processor 123 may consume less power or may be more specialized in a specific function compared with the main processor 121. The secondary processor 123 may be implemented separately from or as part of the main processor 121.

The secondary processor 123 may control at least some of the functions or states associated with at least one component (e.g., the display unit 160, the sensor module 176, or the communication module 190) among the components of the electronic device 101, for example, instead of the main processor 121 while the main processor 121 is in an inactive (e.g., sleep) state, or together with the main processor 121 while the main processor 121 is in an active (e.g., application execution) state. In an example embodiment, the secondary processor 123 (e.g., image signal processor or communication processor) may be implemented as a part of another component (e.g., the camera module 180 or the communication module 190) that is functionally related to the secondary processor 123.

The memory 130 may store a variety of data used by at least one component (e.g., the processor 120 or the sensor module 176) of the electronic device 101. The data may include, for example, software the program 140) and input data or output data for commands associated with the software. The memory 130 may include the volatile memory 132 or the nonvolatile memory 134.

The programs 140 may be stored in the memory 130 as software, and may include, for example, an operating system 142, a middleware 144, or an application 146.

The input unit 150 may receive a command or data, which can be to be used for a component (e.g., the processor 120) of the electronic device 101, from the outside of the electronic device 101 (e.g., user). The input unit 150 may include, for example, a microphone, a mouse, a keyboard, or a digital pen (e.g., stylus pen).

The sound output unit 155 may output a sound signal to the outside of the electronic device 101. The sound output unit 155 may include, for example, a speaker and a receiver. The speaker may be used for general purposes, such as playback of multimedia or recordings, and the receiver may be used for receiving an incoming call. In an example embodiment, the receiver may be implemented separately from or as part of the speaker.

The display unit 160 may visually present information to the outside of the electronic device 101 (e.g., user). The display unit 160 may include, for example, a display, a hologram device, or a projector, and a control circuit for controlling these. In an example embodiment, the display unit 160 may include a touch circuitry configured to sense a touch, or a sensing circuitry (e.g., pressure sensor) configured to measure the strength of a force caused by a touch action.

The audio module 170 may convert a sound into an electric signal or convert an electric signal into a sound. In an example embodiment, the audio module 170 may obtain a sound signal through the input unit 150 or may output a sound signal through an external electronic device (e.g., the first external electronic device 102 (e.g., speaker or headphone)) wiredly or wirelessly connected to the sound output unit 155 or the electronic device 101.

The sensor module 176 may generate an electrical signal or a data value corresponding to the operating state (e.g., power or temperature) of the electronic device 101 or the environmental state (e.g., user state) outside the electronic device 101. The sensor module 176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 177 may support one or more designated protocols that enable the electronic device 101 to directly or wirelessly connect to an external electronic device (e.g., the first external electronic device 102). In an example embodiment, the interface 177 may include, for example, a high-definition multimedia interface (HIM), a universal serial bus (USB) interface, an SD card interface, or an audio interface.

The connection terminal 178 may include a connector through which the electronic device 101 can be physically connected to an external electronic device (e.g., the first external electronic device 102). In an example embodiment, the connection terminal 178 may include, for example, an HDMI connector, a USB connector, a secure digital (SD) card connector, or an audio connector (e.g., headphone connector).

The haptic module 179 may convert an electrical signal into a mechanical stimulus (e.g., vibration or motion) or an electrical stimulus that can be perceived by the user through tactile or kinesthetic senses. In an example embodiment, the haptic module 179 may include, for example, a motor, a piezoelectric element, or an electric stimulator.

The camera module 180 may capture a still image or a moving image. In an example embodiment, the camera module 180 may include at least one lens, an image sensor, an image signal processor, or a flash.

The power management module 188 may manage the power supplied to the electronic device 101. The power management module 188 may be implemented as part of a power management integrated circuit (PMIC).

The battery 189 may supply power to at least one component of the electronic device 101. In an example embodiment, the battery 189 may include, for example, a non-rechargeable primary cell, a rechargeable secondary cell, or a fuel cell.

The communication module 190 may establish a wired or wireless communication channel between the electronic device 101 and the external electronic device (e.g., the first external electronic device 102, the second external electronic device 104, or the server 108) and support communication through the established communication channel. The communication module 190 may include at least one communication processor that can operate separately from the processor 120 (e.g., application processor) to support wired or wireless communication. In an example embodiment, the communication module 190 may include a wireless communication module 192 (e.g., cellular communication module, short-range wireless communication module, or global navigation satellite system (GNSS) communication module), or a wired communication module 194 (e.g., local area network (LAN) communication module, or power line communication module). The corresponding communication module may communicate with an external electronic device through the first network 198 (e.g., short-range communication network such as Bluetooth, Wi-Fi direct, or infrared data association (IrDA)) or through the second network 199 (e.g., long-distance communication network such as a cellular network, the Internet, or a computer network like a LAN or WAN). The above various communication modules may be implemented as one component (e.g., single chip) or as separate components multiple chips). The wireless communication module 192 may identify and authenticate the electronic device 101 in the communication network such as the first network 198 or the second network 199 by using subscriber information stored in the subscriber identification module 196.

The antenna module 197 may transmit or receive a signal or power to or from the outside (e.g., the external electronic devices 102 or 104). In an example embodiment, the antenna module 197 may include one antenna having a radiator made of a conductor or conductive pattern formed on a substrate (e.g., PCB). In an example embodiment, the antenna module 197 may include a plurality of antennas. In this case, at least one antenna suitable for the communication scheme used in the communication network such as the first network 198 or the second network 199 may be selected from the plurality of antennas by, for example, the communication module 190. The signal or power may be transmitted or received between the communication module 190 and the external electronic devices 102 or 104 through the selected at least one antenna. In an example embodiment, in addition to the radiator, another component (e.g., radio frequency integrated circuit (RFIC)) may be further formed as part of the antenna module 197.

At least some of the above components may be connected to each other via a communication scheme between peripherals (e.g., bus, general purpose input and output (GPIO), serial peripheral interface (SPI), or mobile industry processor interface (MIPI)), and may exchange signals (e.g., commands or data) with each other.

In an example embodiment, commands or data may be exchanged between the electronic device 101 and the second external electronic device 104 through the server 108 connected to the second network 199. The external electronic devices 102 and 104 may be of the same type as or a different type from the electronic device 101. In an example embodiment, all or some of the operations that can be performed by the electronic device 101 may be performed by one or more of the external electronic devices 102, 104 and 108. For example, to perform a certain function or service automatically or upon request, the electronic device 101 may, instead of or in addition to executing the function or service, request one or more external electronic devices to execute at least some of the function or service. Upon reception of the request, the external electronic devices may execute at least a portion of the requested function or service or an additional function or service related to the request, and return the execution results to the electronic device 101. The electronic device 101 may further process the received results if necessary and provide the processing results as a response to the requested function or service. To this end, technologies such as cloud computing, distributed computing, and client-server computing may be used.

The electronic device according to various embodiments disclosed herein can be one of various types of devices, such as, for example, and without limitation, portable communication devices (e.g., smartphones), computers, portable multimedia devices, portable medical instruments, cameras, wearable devices, home appliances, or the like. However, the electronic device is not limited to the above-mentioned devices.

It should be understood that the various example embodiments of the disclosure and the terminology used herein are not intended to limit the disclosure to specific embodiments but to include various modifications, equivalents, and/or alternatives thereof. In the drawings, the same or similar reference symbols are used to refer to the same or like parts. In the description, the singular forms "a", "an" and "the" are intended to include the plural forms as well, unless the context clearly indicates otherwise. In the description, the expression "A or B", "at least one of A and/or B", "A, B or C", or "at least one of A, B and/or C" may indicate all possible combinations of the listed items. The terms "first" and "second" may refer to various elements regardless of importance and/or order and are used to distinguish one element from another element without limitation. It will be understood that when an element (e.g., first element) is referred to as being (functionally or communicatively) "coupled with/to" or "connected with/to" another element (e.g., second element), it can be coupled or connected with/to the other element directly (e.g., wiredly), wirelessly, or via a third element.

In the description, the term "module" may refer to a certain unit that is implemented in hardware, software, firmware, or a combination thereof. The term "module" may be used interchangeably with the term "unit", "logic", "logical block", "component", or "circuit", for example. The module may be the minimum unit, or a part thereof, which performs one or more particular functions. For example, a module may be implemented in the form of an application-specific integrated circuit (ASIC).

Various embodiments of the disclosure may be implemented in software (e.g., the programs 140) including instructions stored in a machine-readable storage medium (e.g., internal memory 136 or external memory 138) readable by a machine (e.g., the electronic device 101). For example, the processor (e.g., the processor 120) of the machine (e.g., the electronic device 101) can fetch a stored instruction from a storage medium and execute the fetched instruction. When the instruction is executed by the processor, the machine may perform the function corresponding to the instruction. The instructions may include a code generated by a compiler and a code executable by an interpreter. The machine-readable storage medium may be provided in the form of a non-transitory storage medium. Here, the "non-transitory" storage medium may not include a signal and is tangible, but does not distinguish whether data is stored semi-permanently or temporarily in the storage medium.

The method according to various embodiments disclosed herein may be provided as a computer program product. A computer program product may be traded between a seller and a purchaser as a commodity. A computer program product may be distributed in the form of a machine-readable storage medium (e.g., compact disc read only memory (CD-ROM)) or be distributed online (e.g., download or upload) directly between two user devices (e.g. smartphones) through an application store (e.g., PlayStore™). For on-line distribution, at least a portion of the computer program product may be temporarily stored or temporarily created in a storage medium such as a memory of a manufacturer's server, an application store's server, or a relay server.

Each of the components (e.g., modules or programs) according to various embodiments described above may comprise one or more elements. An existing component may be omitted, and a new component may be added. Alternatively or additionally, some of the components (e.g., modules or programs) may be combined into one entity while maintaining the same functionality. Operations supported by a module, program, or another component may be carried out in sequence, in parallel, by repetition, or heuristically. Some operations may be executed in a different order or may be omitted, and a new operation may be added.

Figure 2B:
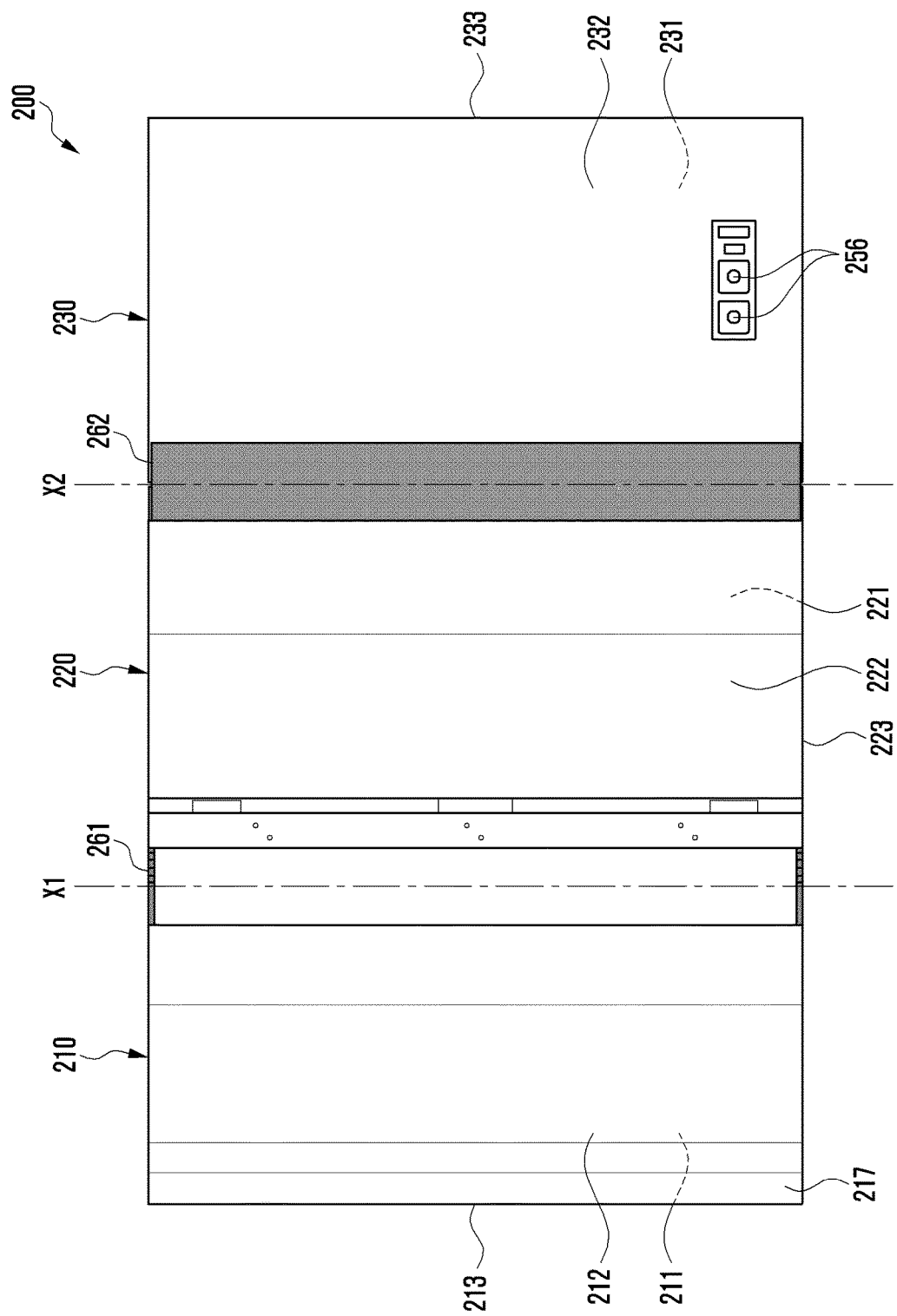
FIG. 2B is a view of a multi-foldable electronic device in the unfolded state, according to an embodiment.
Figure 2C:
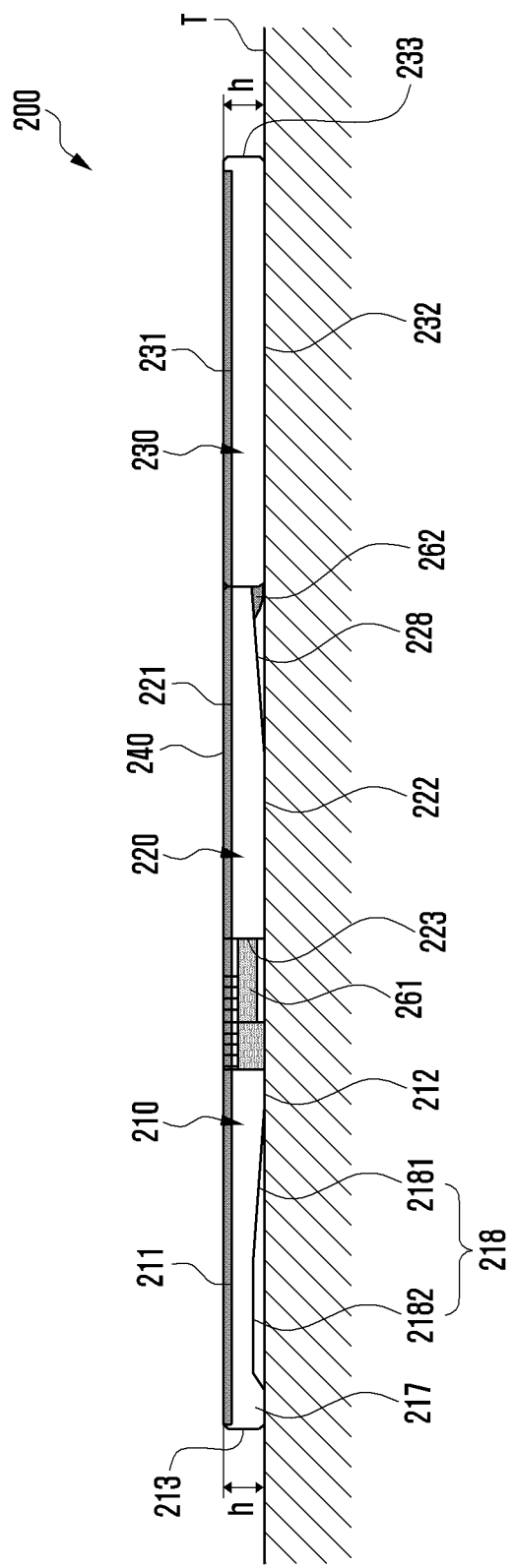
FIG. 2C is a view of a multi-foldable electronic device in the unfolded state, according to an embodiment.

FIGS. 2A to 2C are views of a multi-foldable electronic device 200 in the unfolded state, according to various embodiments.

With reference to FIGS. 2A and 2B, the electronic device 200 includes a first housing structure 210, a second housing structure 220, and a third housing structure 230 that are rotatably arranged with each other. The first housing structure 210 and the second housing structure 220 may be rotatably connected to each other through a first hinge structure 261 with respect to a first rotation axis X1. The second housing structure 220 and the third housing structure 230 may be rotatably connected to each other through a second hinge structure 262 with respect to a second rotation axis X2. The first housing structure 210 and the second housing structure 220 may be operated in a first folding scheme (e.g., out-folding or outwardly folding) through the first hinge structure 261. For example, when the first housing structure 210 and the second housing structure 220 are folded, the first display area DA1 and second display area DA2, respectively facing the first housing structure 210 and the second housing structure 220, may be disposed to face in opposite directions so as to be visible from outside the electronic device. The second housing structure 220 and the third housing structure 230 may be operated in a second folding scheme (e.g., in-folding) through the second hinge structure 262. For example, when the second housing structure 220 and the third housing structure 230 are folded, the second display area DA2 and third display area DA3, respectively facing the second housing structure 220 and the third housing structure 230, may be disposed to face each other. The multi-foldable electronic device 200 may be operated while the first housing structure 210, the second housing structure 220, and the third housing structure 230 are completely unfolded. The multi-foldable electronic device 200 may be operated while only the first housing structure 210 and the second housing structure 220 are folded. The multi-foldable electronic device 200 may be operated while the first housing structure 210, the second housing structure 220, and the third housing structure 230 are folded. In this case, when the multi-foldable electronic device 200 is viewed from above, the first housing structure 210, the second housing structure 220 and the third housing structure 230 may be folded to overlap with each other through the out-folding hinge structure 261 and the in-folding hinge structure 262. The first display area DA1 facing the first housing structure 210 may be, in the completely folded state, disposed toward the outside of the electronic device so as to be visible to the user.

The first housing structure 210 may include a first surface 211, a second surface 212 facing away from the first surface 211, and a first side member 213 surrounding a first space 2101 between the first surface 211 and the second surface 212. The second housing structure 220 may include a third surface 221, a fourth surface 222 facing away from the third surface 221, and a second side member 223 surrounding a second space 2201 between the third surface 221 and the fourth surface 222. The third housing structure 230 may include a fifth surface 231, a sixth surface 232 facing away from the fifth surface 231, and a third side member 233 surrounding a third space 2301 between the fifth surface 231 and the sixth surface 232. At least a portion of the first housing structure 210, the second housing structure 220, and/or the third housing structure 230 may be made of a metal or non-metal material having a selected stiffness level to support the display 240. The portions facing the first surface 211, the third surface 221 and the fifth surface 231 of the first housing structure 210, the second housing structure 220, and the third housing structure 230 may be made of a support plate (e.g., a support member or support structure) to support the display 240. When the first housing structure 210, the second housing structure 220, and/or the third housing structure 230 are made of a metal material, the corresponding first side member 213, second side member 223, and third side member 233 may include an at least partially electrically separated conductive portion, and the electrically separated conductive portion may be electrically connected to a wireless communication circuit, and may be used as at least one antenna (e.g., a legacy antenna) operating in a specific frequency band. The second surface 212, the fourth surface 222, and the sixth surface 232 may include a rear cover that is formed as a part of the first housing structure 210, the second housing structure 220, and the third housing structure 230 or structurally coupled therewith. The rear cover can be made of, for example, coated or colored glass, ceramic, polymer, or metal (e.g., aluminum, stainless steel (STS), or magnesium), or a combination thereof.

When the multi-foldable electronic device 200 is completely unfolded, the display 240 (e.g., a flexible display) may extend from the first surface 211 through the third surface 221 to at least a portion of the fifth surface 231. The display 240 may include a first display area DA1 facing the first housing structure 210, a second display area DA2 facing the second housing structure 220, and a third display area DA3 facing the third housing structure 230. The first display area. DA1, the second display area DA2 and the third display are DA3 may be manipulated to face each other or face opposite directions according to the operation of the first housing structure 210, the second housing structure 220 and the third housing structure 230.

The first housing structure 210 and the second housing structure 220 may be operated so that the second surface 212 and the fourth surface 222 face each other in the folded state, and may be operated so that the first surface 211 and the third surface 221 face in the same direction in the unfolded state. In this case, the display 240 may be arranged such that the first display area DA1 and the second display area DA2 are visible from the outside (e.g., from outside the electronic device) when the first housing structure 210 and the second housing structure 220 are folded. The second housing structure 220 and the third housing structure 230 may be operated so that the third surface 221 and the fifth surface 231 face each other in the folded state and face in the same direction in the unfolded state. In this case, the display 240 may be arranged such that the second display area DA2 and the third display area DA3 face each other to be invisible from the outside when the second housing structure 220 and the third housing structure 230 are folded.

The first hinge structure 261 may include a rail-type multi-joint hinge module to allow the first housing structure 210 and the second housing structure 220 to operate in an out-folding (e.g., outwardly folding) manner. The first hinge structure 261 may include a regular multi-joint hinge module when the area and/or length of the display is changed according to the out-folding operation of the first housing structure 210 and the second housing structure 220. The multi-joint hinge module may include a one-axis, two-axis, or multi-axis hinge module. The second hinge structure 262 may include a one-axis or two-axis hinge module to allow the second housing structure 220 and the third housing structure 230 to operate in an in-folding (e.g., inwardly folding) manner.

The multi-foldable electronic device 200 may include at least one electronic component that is disposed under at least a portion of the display 240 or exposed through an opening (e.g., a punch hole) formed on at least a portion of the display 240. The least one electronic component may include at least one camera module 214 (e.g., a front camera module) exposed through an opening of the display 240 and/or at least one sensor module 215 disposed on the rear surface of the display 240 to sense the external environment. The at least one camera module 214 may be disposed in the first display area. DA1. The at least one camera module 214 may be disposed in the second display area DA2 and/or the third display area DA3. The at least one sensor module 215 may include at least one of a proximity sensor, an illuminance sensor, an iris recognition sensor, an ultrasonic sensor, a fingerprint recognition sensor, a distance measurement sensor (e.g., a time of flight (TOO sensor), or an indicator. The at least one electronic component may be disposed in the second display area DA2 and/or the third display area DA3. The electronic device 200 may include a receiver 216 disposed through at least a portion of the first housing structure 210. The multi-foldable electronic device 200 may include an interface connector port, an ear jack hole, an external speaker module, an external card (a subscriber identity module (SIM), a user identity module (UIM) or an SD card) tray, or at least one key button disposed by using the first housing structure 210, the second housing structure 220, and/or the third housing structure 230. The multi-foldable electronic device 200 may further include at least one camera module 256 (e.g., rear camera module) disposed through the sixth surface 232 of the third housing structure 230 to be exposed to the outside in the folded state.

Due to the in-folding structure where the display 240 is not completely folded, when the second housing structure 220 and the third housing structure 230 are folded, the thickness of a portion closer to the second hinge structure 262 may be thicker than that of a distant portion. This is because the display 240 is folded to have a specific curvature due to the second hinge structure 262 with an in-folding mechanism. Consequently, when the first housing structure 210, the second housing structure 220, and the third housing structure 230 are completely folded relative to each other, the thickness may increase and visibility may deteriorate as the display 240 is disposed not parallel to the cradle surface T. Thus, a housing coupling structure that enables the display 240 to be disposed parallel to the cradle surface T and to reduce the overall thickness when the multi-foldable electronic device 200 is completely folded may be provided.

In the multi-foldable electronic device 200, it is possible to change the shape of the second surface 212 of the first housing structure 210 and change the shape of the fourth surface 222 of the second housing structure 220 corresponding thereto accordingly, so that the entire thickness of the electronic device 200 can be reduced in the folded state. The second surface 212 of the first housing structure 210 may include a recess 218 at least partially formed to be less than the total thickness h of the first housing structure 210 (e.g., the vertical distance h from the first surface 211 to the second surface 212). The fourth surface 222 of the second housing structure 220 may also include a portion 228 corresponding to the recess 218 to make surface contact with the second surface 212 of the first housing structure 210 in the folded state. The recess 218 may include a first portion 2181 and/or a second portion 2182 formed to be lower than (e.g., have a lower vertical distance than) the thickness h (e.g., a vertical distance h) of each of the first housing structure 210, the second housing structure 220, and the third housing structure 230. The first portion 2181 may include a tapered inclined surface that is lower than (e.g., has a lower vertical distance than) the overall thickness h of the first housing structure 210. The second portion 2182 may include a flat surface extending from the first portion 2181 and parallel to the first surface 211. Alternatively, the first portion 2181 and the second portion 2182 may be formed not to be continuous. The first housing structure 210 may include a support part 217 at least partially formed to have the same thickness as the second housing structure 220 and/or the third housing structure 230 in a state where the multi-foldable electronic device 200 is fully unfolded. The support part 217 may be formed in a region of the first housing structure 210 farthest from the first hinge structure 261. Hence, when the multi-foldable electronic device 200 is fully unfolded, the display 240 may be disposed parallel to the cradle surface T through the first housing structure 210, the second housing structure 220, and the third housing structure 230 having at least partially the same thickness h. The recess 218 may accommodate at least a portion of the second hinge structure 262 when the electronic device 200 is folded. The first housing structure 210 may include a separate recess or support part formed on the second surface 212 to accommodate at least a portion of the second hinge structure 262 when the electronic device 200 is folded.

Figure 3:
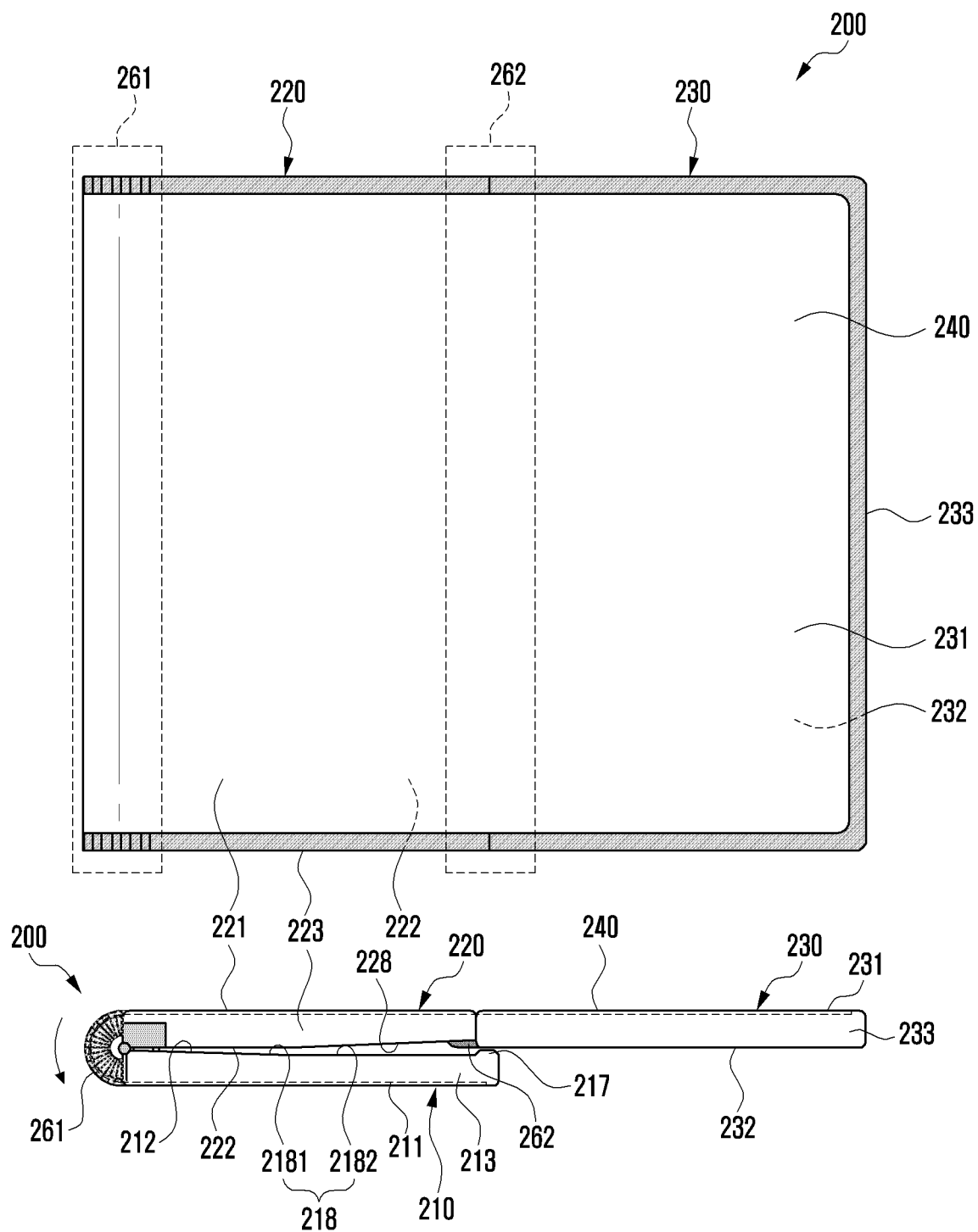
FIG. 3 is a view of a multi-foldable electronic device in the first folded state, according to an embodiment.

FIG. 3 is a view of a multi-foldable electronic device 200 in the first folded state, according to an embodiment.

With reference to FIG. 3, the display 240 of the multi-foldable electronic device 200 may be arranged through a first folding operation (e.g., out-folding) of the first housing structure 210 and the second housing structure 220 so that the first display area DA1 and the second display area DA2 face in opposite directions to be visible from outside the electronic device. In this case, the processor 120 of the electronic device 200 may detect a first folded state and may control, based on the detected result, the display 240 to operate only the second display area DA2 and the third display area DA3 respectively provided on the third surface 221 of the second housing structure 220 and the fifth surface 231 of the third housing structure 230 facing in the same direction. The processor 120 may control the display 240 to output a piece of content having a resolution corresponding to a 4:3 aspect ratio on the second display area DA2 and the third display area DA3. The processor 120 may deactivate the first display area DA1 facing in the opposite direction to the second display area DA2 and the third display area DA3. Alternatively, the processor 120 may control the first display area DA1 to remain in an activated state. The support part having a relatively large thickness h formed at the side end of the first housing structure 210 may be disposed to face at least a portion of the third housing structure 230 (e.g., the sixth surface 232) without facing the fourth surface 222 of the second housing structure 220.

Figure 4:
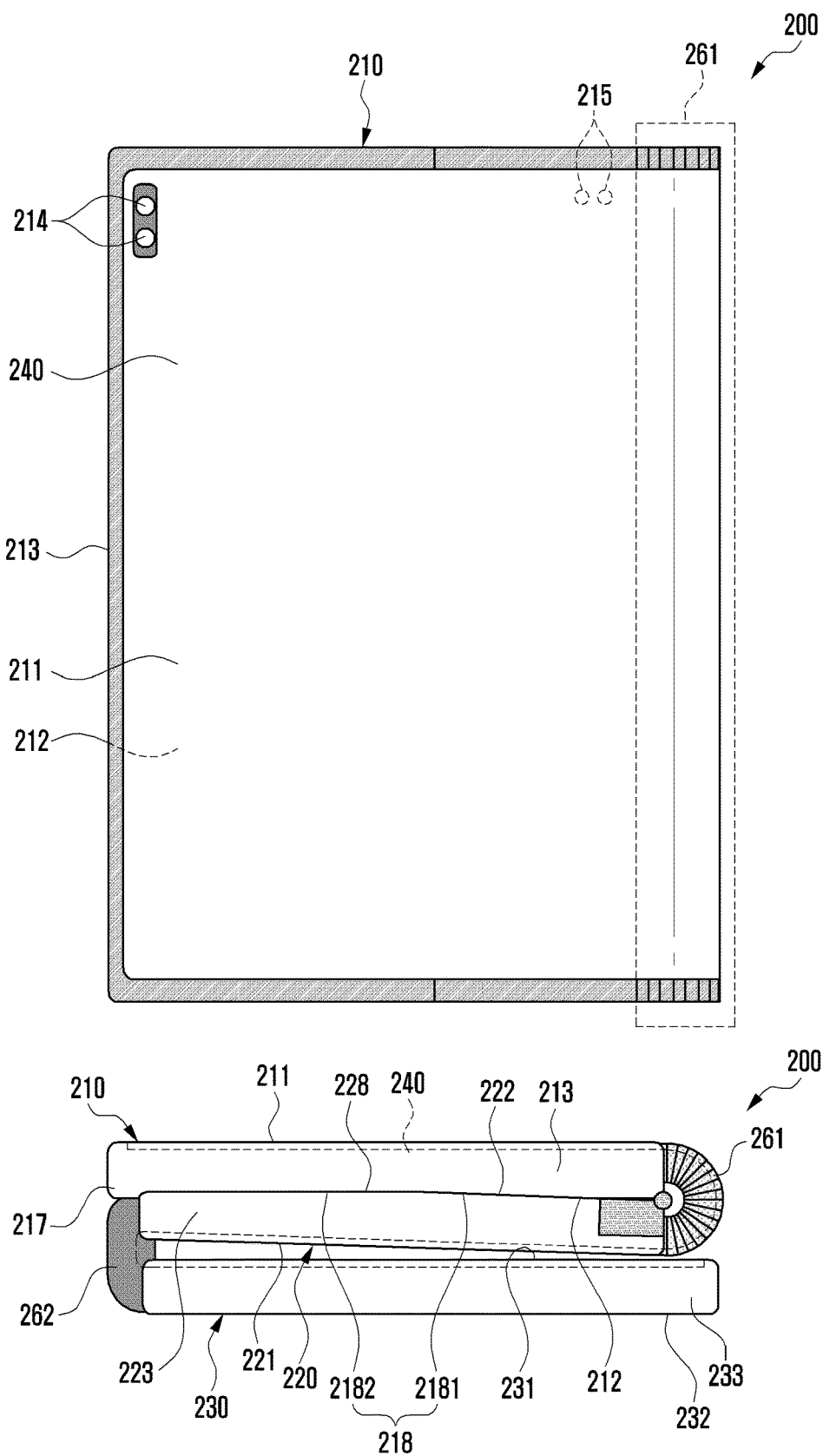
FIG. 4 is a view of a multi-foldable electronic device in the second folded state, according to an embodiment.

FIG. 4 is a view of a multi-foldable electronic device 200 in the second folded state, according to an embodiment.

With reference to FIG. 4, when the multi-foldable electronic device 200 is folded through the first folding operation of FIG. 3, the display 240 may be arranged such that only the first display area DA1 is visible from the outside through a second folding operation (e.g., in-folding) of the second housing structure 220 and the third housing structure 230. The second display area DA2 and the third display area. DA3 may be folded so as to face each other and not be visible from the outside. Hence, the recess 218 formed on the second surface 212 of the first housing structure 210 is in surface contact with the fourth surface 222 of the second housing structure 220 formed in a corresponding shape, and the support part 217 of the first housing structure 210 is disposed to surround at least a portion of the second side member 223 of the second housing structure 220 for support. In this case, the processor 120 of the electronic device 200 may detect a second folded state, and may control, based on the detected result, the display 240 to operate only the first display area DA1 disposed on the first surface 211 of the first housing structure 210. For example, the processor 120 may control the display 240 to output a piece of content having a resolution corresponding to an 18.5:9 aspect ratio on the first display area DA1. The processor 120 may deactivate the second display area DA2 and the third display area DA3 that are folded to face each other and not visible from the outside.

Figure 5:
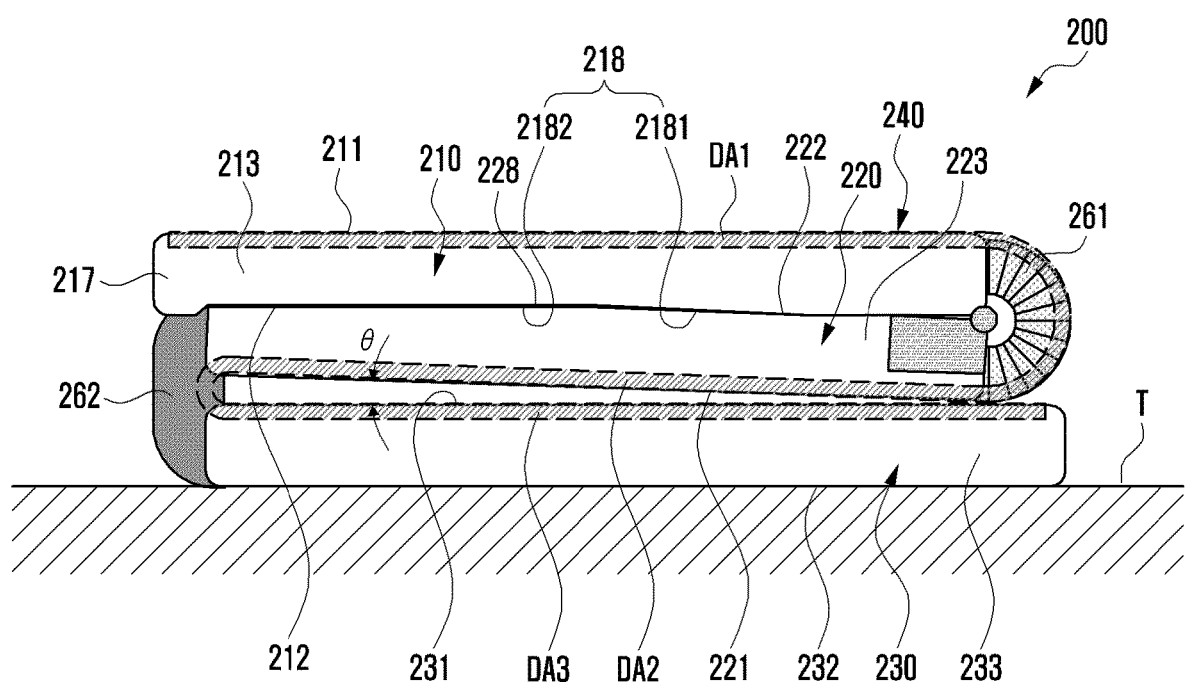
FIG. 5 is a view of a multi-foldable electronic device in the completely folded state, according to an embodiment.

FIG. 5 is a view of a multi-foldable electronic device 200 in the completely folded state, according to an embodiment.

With reference to FIG. 5, when the multi-foldable electronic device 200 is completely folded, the recess 218 formed on the second surface 212 of the first housing structure 210 may face the fourth surface 222 of the second housing structure 220 formed in a corresponding shape to be in surface contact with the second surface 212 and the fourth surface 222, reducing the overall thickness of the electronic device 200. For example, through a modified facing configuration between the recess 218 of the first housing structure 210 and the corresponding portion 228 of the second housing structure 220, it is possible to reduce the overall thickness of the electronic device 200 due to the in-folding scheme where the second housing structure 220 and the third housing structure 230 are folded relative to the second hinge structure 262 with a certain angle θ.

By means of the modified facing configuration through changes in the thickness of the first housing structure 210 and the second housing structure 220, when the multi-foldable electronic device 200 in the fully folded state is placed on a cradle surface T, the first display area DA1 can be arranged to be parallel to the cradle surface T, securing excel lent visibility. In this case, the first display area DA1 may be disposed parallel to the third display area DA3, the second display area DA2 may be inclined to have a certain angle θ with respect to the third display area DA3 due to the in-folding hinge structure 262.

To place the first display area DA1 in parallel with the cradle surface T when the electronic device 200 is completely folded, the shape of the recess 218 (e.g., the inclination angle) may be determined by the inclination angle θ between the second housing structure 220 and the third housing structure 230 folded about the second hinge structure 262. The inclination angle θ between the second housing structure 220 and the third housing structure 230 may be determined by the shape of the recess 218. The electronic device may further include a recess formed on the second surface 212 of the first housing structure 210 to support or accommodate at least a portion of the second hinge structure 262 in a folded state. The curvature of the region of the display 240 folded through the first hinge structure 261 may be set to be greater than the curvature of the region of the display 240 folded through the second hinge structure 262.

Figure 6:
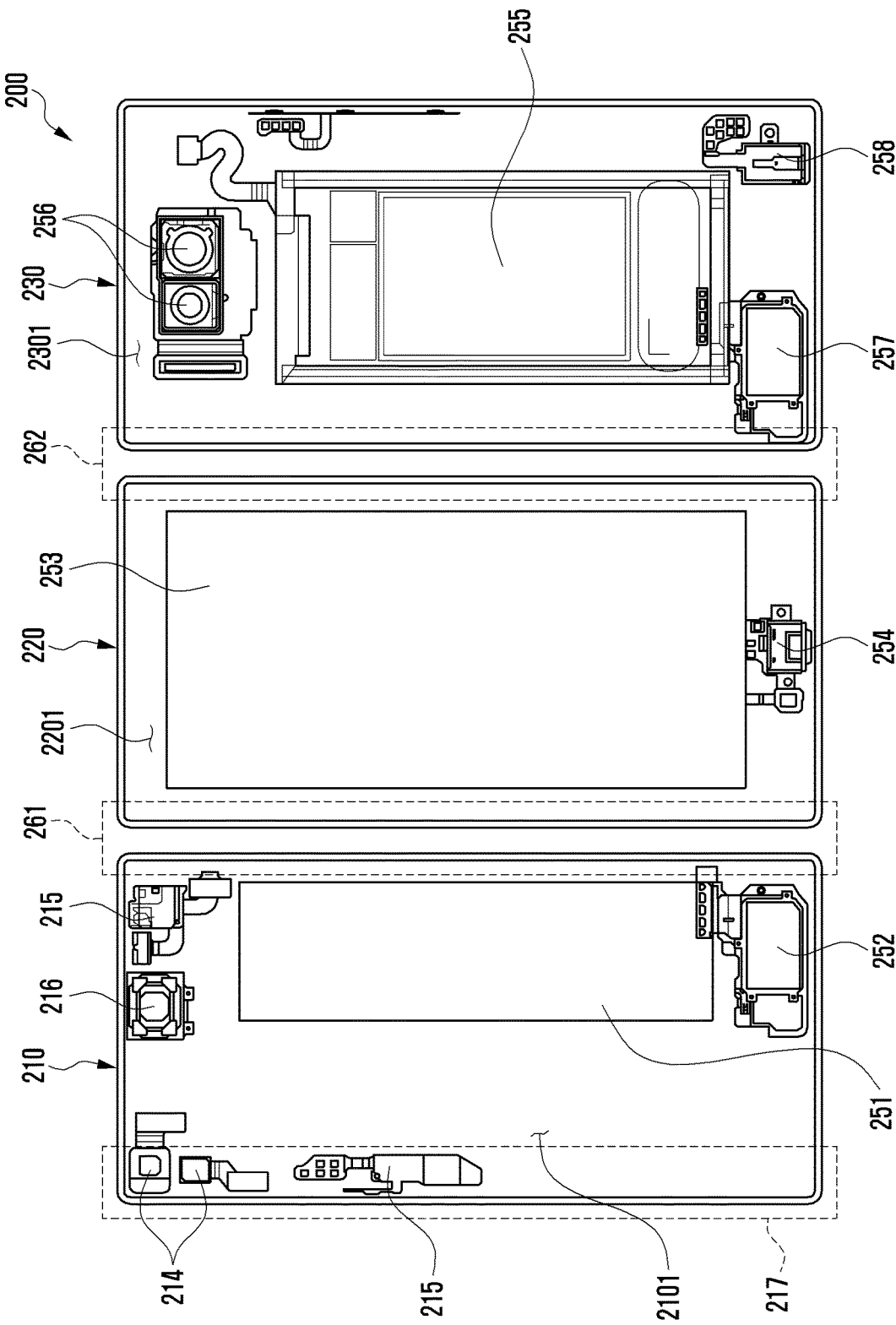
FIG. 6 illustrates the internal configuration of a multi-foldable electronic device, according to an embodiment.

FIG. 6 illustrates the internal configuration of a multi-foldable electronic device 200, according to an embodiment.

A configuration of the electronic device 200 due to a partial change in the thickness of the first housing structure 210 and the second housing structure 220 provided to reduce the overall thickness of the multi-foldable electronic device 200 in the folded state may require an efficient placement relationship between electronic components (e.g., electronic function groups) to be disposed in the internal spaces (e.g., the first space 2101, the second space 2201, and the third space 2301) of the first housing structure 210, the second housing structure 220 and the third housing structure 230.

With reference to FIG. 6, the multi-foldable electronic device 200 includes at least one of a first camera module 214, a second camera module 256, a sensor module 215, a printed circuit board (PCB) 253, an interface connector port 254, a receiver 216, a first battery 251, a second battery 255, a first speaker module 252, a second speaker module 257, and/or an ear jack assembly 258 to be arranged in the first space 2101, the second space 2201 and the third space 2301 provided through the first housing structure 210, the second housing structure 220 and the third housing structure 230. Bulky electronic components may be disposed in an interior space provided by one of the housing structures with a relatively large thickness or without a thickness change. Electronic components with a relatively small volume may be disposed in the recess 218 or in the first space 2101 and the second space 2201 of the first housing structure 210 and/or the second housing structure 220 formed in a shape corresponding to the recess 218 in accordance with the reduced thickness.

The first battery 251 may include a main battery disposed in the third space 2301 of the third housing structure 230 without a thickness change, and the second battery 255 may include a sub battery disposed at a relatively spacious site near the first hinge structure 261 within the first space 2101 of the first housing structure 210. The first camera module 214 may include a front camera module disposed at a relatively spacious site corresponding to the support part 217 within the first space 2101 of the first housing structure 210, and the second camera module 256 may include a rear camera module disposed at a site adjacent to the first battery 255 within the third space 2301 of the third housing structure 230. The first speaker module 252 may be disposed at a relatively spacious site near the second battery 251 adjacent to the first hinge structure 261 within the first space 2101 of the first housing structure 210, and the second speaker module 257 may be disposed adjacent to the first battery 251 within the third space 2301 of the third housing structure 230 without a thickness change. The receiver 216 and the at least one sensor module 215 may, in order to be used when the electronic device 200 is in the completely folded state, be disposed at a site corresponding to the relatively thick support part 217 and/or a site near the first hinge structure 261 within the first space 2101 of the first housing structure 210. The ear jack assembly 258 may be disposed adjacent to the first battery 255 within the third space 2301 of the third housing structure 230. The PCB 253 (e.g., the main board) may be disposed in the second space 2201 of the second housing structure 220 for easy electrical connection with electronic components arranged in the first space 2101 and the second space 2201 of the first housing structure 210 and the second housing structure 220 through an electrical connection member (e.g., a flexible printed circuit board (FPCB)). The interface connector port 254 may also be disposed at a site adjacent to the PCB 253 within the second space 2201 of the second housing structure 220. The PCB 253 may be electrically connected to electronic components arranged in the first space 2101 and the second space 2201 of the first housing structure 210 and the third housing structure 230 through the electrical connection member disposed across the first hinge structure 261 and the second hinge structure 262. The electronic device 200 may include a second PCB (e.g., a first sub-board) disposed in the first space 2101 of the first housing structure 210 and/or a third PCB (e.g., a second sub-board) disposed in the third space 2301 of the third housing structure 230. In this case, the second PCB and the third PCB may also be electrically connected through the above-described electrical connection member disposed across the first hinge structure 261 and the second hinge structure 262.

Figure 7A:
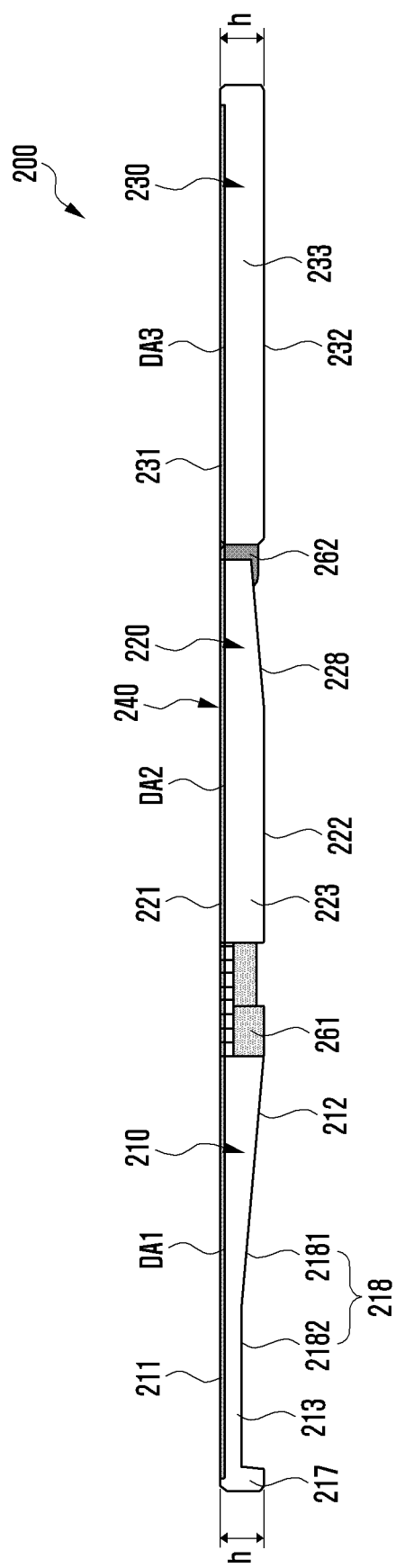
FIG. 7A is a side view of a multi-foldable electronic device in the unfolded state, according to an embodiment.
Figure 7B:
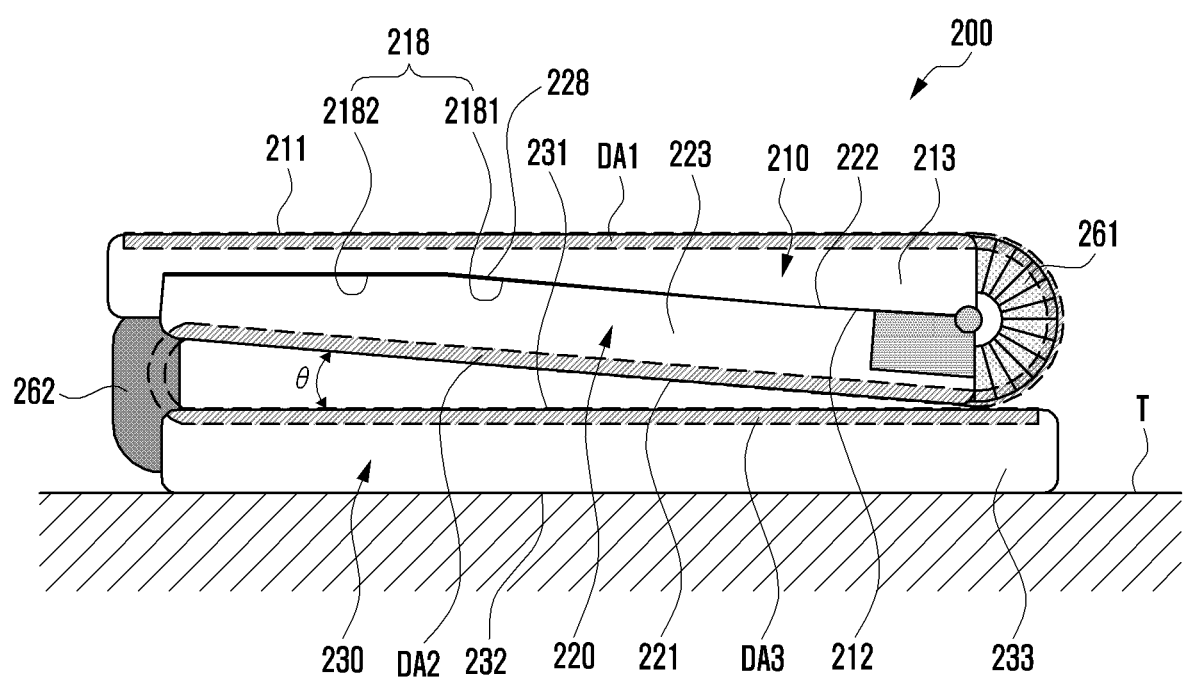
FIG. 7B is a side view of a multi-foldable electronic device in the folded state, according to an embodiment.

FIG. 7A is a side view of a multi-foldable electronic device 200 in the unfolded state, according to an embodiment. FIG. 7B is a side view of the multi-foldable electronic device 200 in the folded state, according to an embodiment.

In the description of FIGS. 7A and 7B, the same reference numerals may be used for the same elements, and overlapping descriptions may be omitted.

With reference to FIGS. 7A and 7B, the multi-foldable electronic device 200 may be configured to have a relatively large radius of curvature for the bending region facing the second hinge structure 262 between the second display area DA2 and the third display area DA3 of the display 240 by making the angle θ between the second housing structure 220 and the third housing structure 230 relatively large in the folded state through the modified facing configuration based on a thickness change in the first housing structure 210 and the second housing structure 220. This is because the bending region of the display 240 having a large radius of curvature is less stressed by bending compared with a bending area having a small radius of curvature, so that deformation of the display 240 due to frequent folding operations can be prevented. In a certain embodiment, the curvature of the region of the display 240 folded through the first hinge structure 261 may be set to be larger than the curvature of the region of the display 240 folded through the second hinge structure 262.

To relatively increase the radius of curvature for the bending region between the second display area DA2 and the third display area DA3, the recess 218 of the first housing structure 210 may be modified to have a thickness less than the original thickness described above and to face the second housing structure 220, thereby increasing the bending angle θ between the second housing structure 220 and the third housing structure 230. In this case, although the bending angle θ between the second housing structure 220 and the third housing structure 230 may be increased, the first display area DA1 may be disposed parallel to the third display area DA3 and may also be arranged parallel to the cradle surface T.

Figure 8A:
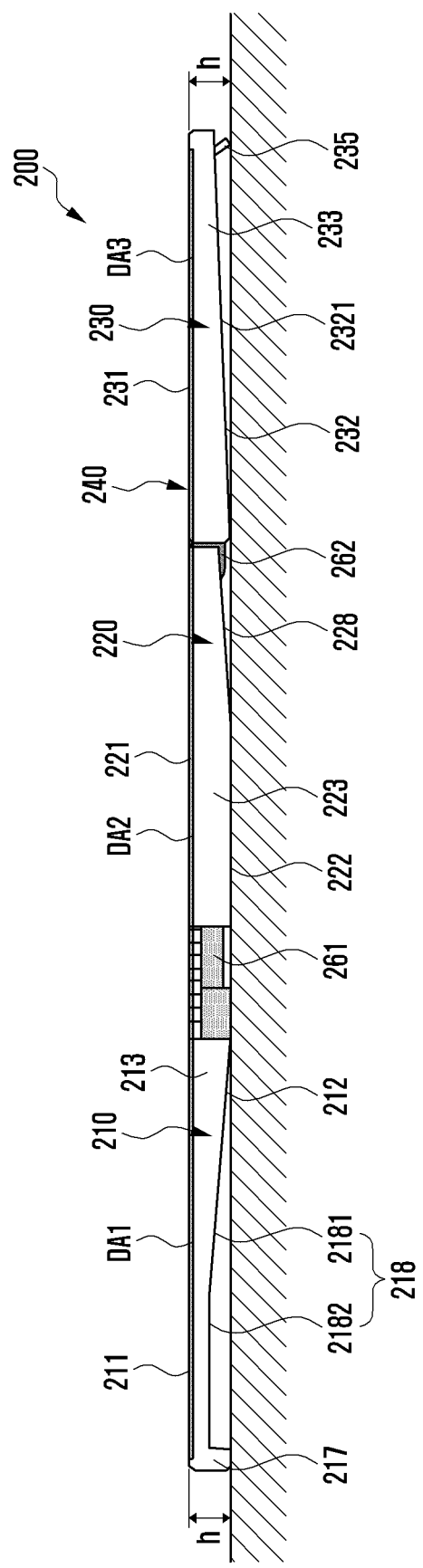
FIG. 8A is a side view of a multi-foldable electronic device in the unfolded state, according to an embodiment.
Figure 8B:
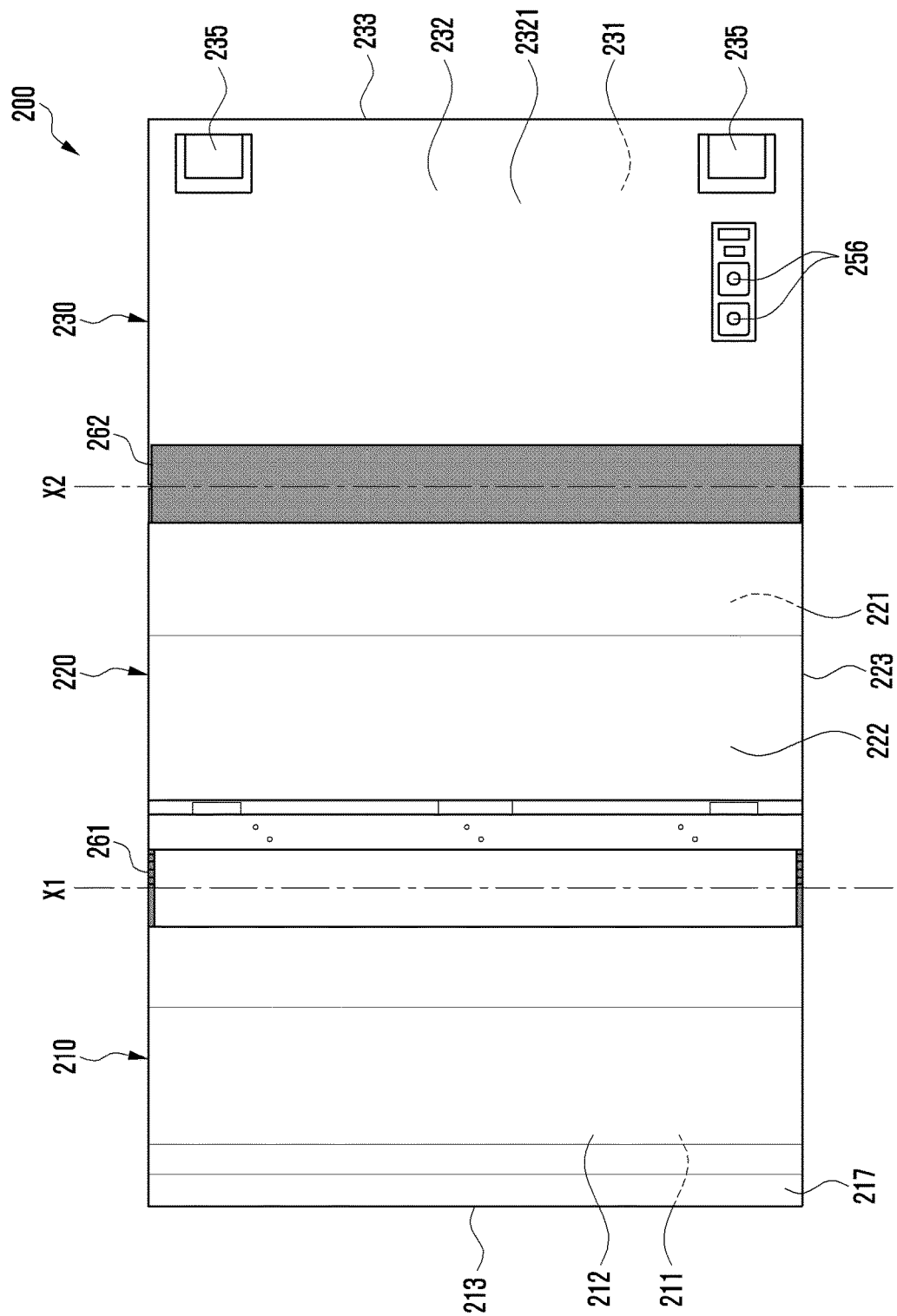
FIG. 8B is a rear view of a multi-foldable electronic device in the unfolded state, according to an embodiment.
Figure 8C:
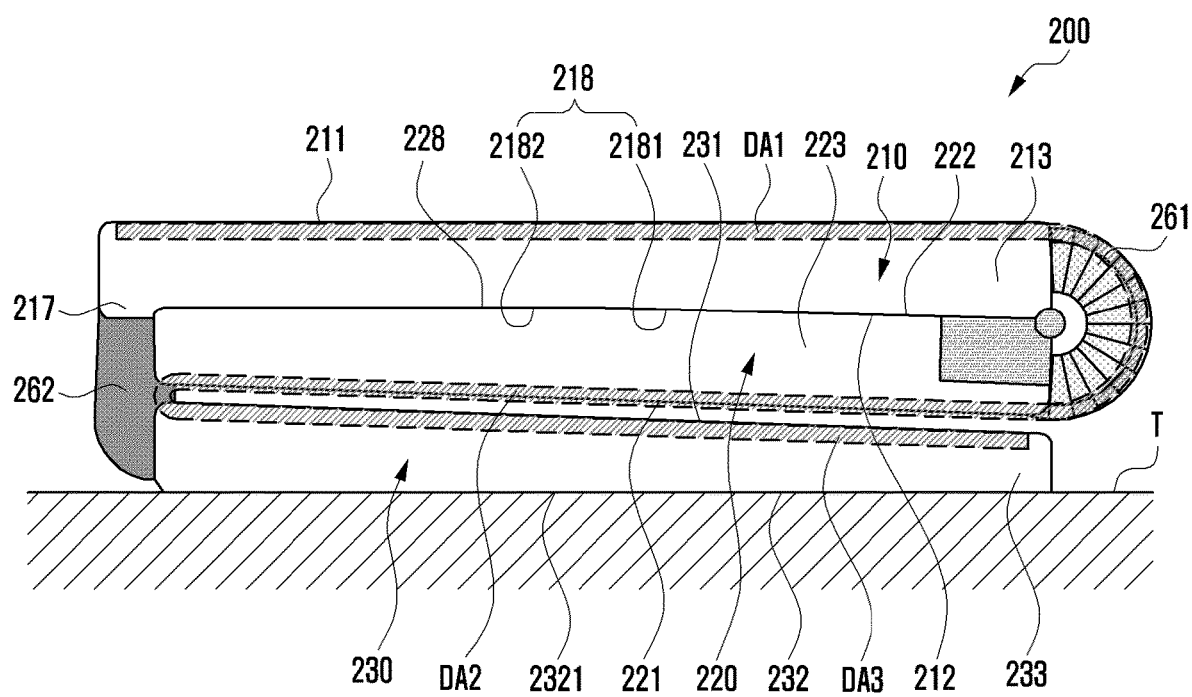
FIG. 8C is a side view of a multi-foldable electronic device in the folded state, according to an embodiment.

FIG. 8A is a side view of a multi-foldable electronic device 200 in the unfolded state, according to an embodiment. FIG. 8B is a rear view of a multi-foldable electronic device 200 in the unfolded state, according to an embodiment. FIG. 8C is a side view of the multi-foldable electronic device 200 in the folded state, according to an embodiment.

In the description of FIGS. SA to 8C, the same reference numerals may be used for the same elements, and overlapping descriptions may be omitted.

With reference to FIGS. SA to 8C, in the multi-foldable electronic device 200, the thickness of the multi-foldable electronic device 200 may be reduced in the folded state by minimizing the radius of curvature of the bending region formed by the second housing structure 220 and the third housing structure 230. For example, the sixth surface 232 of the third housing structure 230 may be formed as an inclined surface 2321 whose vertical distance from the fifth surface 231 gradually decreases as the distance from the second hinge structure 262 increases. In this case, when the multi-foldable electronic device 200 is placed on the cradle surface in the completely unfolded state, the first housing structure 210 may have the largest thickness h of individual housing structures due to the support part 217 formed at the side portion, but the third housing structure 230 may not have the largest thickness h of the housing structure due to the inclined surface 2321. Hence, the third housing structure 230 may include at least one support piece 235 selectively protruding outward through the sixth surface 232 in the third space 2301. When the multi-foldable electronic device 200 is fully unfolded, the at least one support piece 235 may protrude through the sixth surface 232 to outside the electronic device, and the protrusion of the support piece 235 may compensate for the thickness reduced by the inclined surface 2321 from the general thickness h. When the multi-foldable electronic device 200 is folded, the at least one support piece 235 may be drawn to the internal space of the third housing structure 230 to be lower than the sixth surface 232, allowing the first display area DA1 to be disposed in parallel with the cradle surface T as shown in FIG. 8C. In this case, the second display area DA2 and the third display area DA3 may be arranged substantially in parallel, and may be disposed to be inclined with respect to the first display area DA1 and/or the cradle surface T. In the case of the first housing structure 210, to compensate for the thickness reduced due to the recess 218 from the thickness h, the support part 217 may be replaced with a structure of the at least one support piece 235, described above.

The electronic device 200 in the unfolded state may have the maximum height h of the first housing structure 210 because an air gap is included in at least a portion of the rear cover disposed on the second surface 212 of the first housing structure. The electronic device 200 in the folded state may have a thickness reduction structure (e.g., the recess 218) as at least a portion of the rear cover becomes closer to the internal space 2101 of the first housing structure 210. Hence, the overall thickness of the electronic device 200 in the folded state may be reduced due to the operation of the rear cover. The sixth surface 232 of the third housing structure 230 may also include a rear cover that operates in the same manner.

Figure 9:
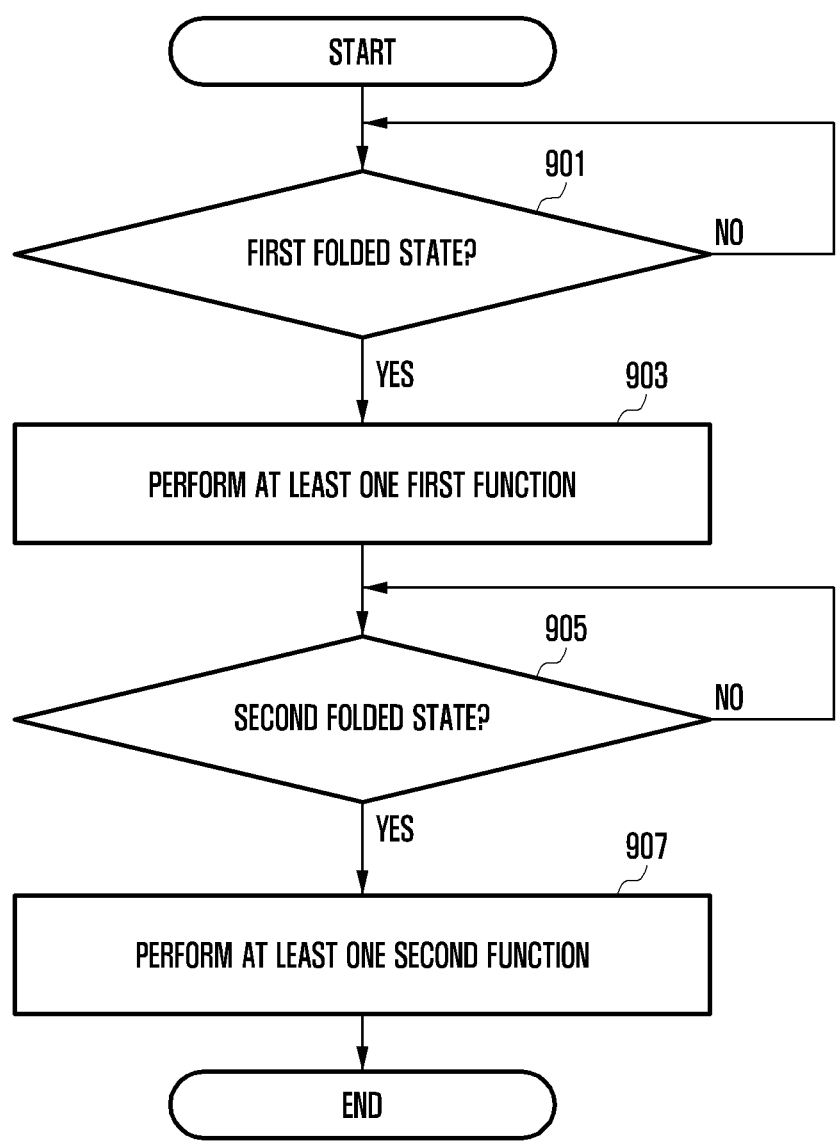
FIG. 9 is a flowchart illustrating operations of a multi-foldable electronic device based on the folding state, according to an embodiment.

FIG. 9 is a flowchart illustrating operations of a multi-foldable electronic device 200 based on the folding state, according to an embodiment.

With reference to FIG. 9, at step 901, the processor 120 of the multi-foldable electronic device 200 checks whether it is in the first folded state. The processor 120 of the electronic device 200 may determine whether the first housing structure 210 and the second housing structure 220 have been folded in a first folding scheme (e.g., out-folding) with respect to the first hinge structure 261. For example, the processor 120 may check whether the first housing structure 210 and the second housing structure 220 are folded by use of at least one sensor (e.g., an acceleration sensor, a gyro sensor, a Hall effect sensor, or a proximity sensor) mounted inside the electronic device 200.

Upon determining that the electronic device 200 is in the first folded state, at step 903, the processor 120 performs at least one first function. For example, in the first folded state, the second display area DA2 and the third display area DA3 of the display 240 may be arranged to face in the same direction. The processor 120 may control the display 240 to operate only the second display area DA2 and the third display area DA3 respectively disposed on the third surface 221 of the second housing structure 220 and the fifth surface 231 of the third housing structure 230 facing in the same direction. For example, the processor 120 may control the display 240 to output a piece of content having a resolution corresponding to a 4:3 aspect ratio on the second display area DA2 and the third display area DA3. The processor 120 may deactivate the first display area DA1 facing in the opposite direction to the second display area DA2 and the third display area DA3. The processor 120 may control the display 240 to maintain the first display area DA1 in an activated state.

At step 905, the processor 120 checks whether the electronic device 200 is in the second folded state. The processor 120 may determine whether the second housing structure 220 and the third housing structure 230 have been folded in a second folding scheme (e.g., in-folding) with respect to the second hinge structure 262 when the electronic device 200 is in the first folded state. For example, the processor 120 may check whether the second housing structure 220 and the third housing structure 230 are folded by use of at least one sensor (e.g., an acceleration sensor, a gyro sensor, a Hall effect sensor, or a proximity sensor) mounted inside the electronic device 200.

Upon determining that the electronic device 200 is in the second folded state, at step 907, the processor 120 performs at least one second function. The processor 120 may control the display 240 to operate only the first display area DA1 disposed on the first surface 211 of the first housing structure 210. For example, the processor 120 may control the display 240 to output a piece of content having a resolution corresponding to an 18.5:9 aspect ratio on the first display area DA1. The processor 120 may control the display 240 to deactivate the second display area. DA2 and the third display area DA3 that are folded to face each other and are not visible from outside the electronic device.

The processor 120 may determine that the third housing structure 230 has been folded relative to the second housing structure 220 when the electronic device 200 is in the completely unfolded state. In this case, the processor 120 may control the display to activate only the first display area DA1.

According to embodiments of the disclosure, the multi-foldable electronic device may have a reduced thickness in the folded state through a structural change in the housing structure, supporting excellent portability. In addition, when the multi-foldable electronic device is placed on the cradle surface, it can be arranged to be parallel to the cradle surface, helping to produce excellent visibility.

According to an embodiment, an electronic device (e.g., electronic device 200 in FIG. 2A) may include a foldable housing that includes a first hinge structure (e.g., first hinge structure 261 in FIG. 2A); a second hinge structure (e.g., second hinge structure 262 in FIG. 2A); a first housing structure e.g., first housing structure 210 in FIG. 2A) including a first surface (e.g., first surface 211 in FIG. 2A), a second surface (e.g., second surface 212 in FIG. 2A) facing away from the first surface, and a first side member (e.g., first side member 213 in FIG. 2A) surrounding a first space (e.g., first space 2101 in FIG. 6) between the first surface and the second surface; a second housing structure (e.g., second housing structure 220 in FIG. 2A) including a third surface (e.g., third surface 221 in FIG. 2A), a fourth surface (e.g., fourth surface 222 in FIG. 2A) facing away from the third surface, and a second side member (e.g., second side member 223 in FIG. 2A) surrounding a second space (e.g., second space 2201 in FIG. 6) between the third surface and the fourth surface; and a third housing structure (e.g., third housing structure 230 in FIG. 2A) including a fifth surface (e.g., fifth surface 231 in FIG. 2A), a sixth surface (e.g., sixth surface 232 in FIG. 2A) facing away from the fifth surface, and a third side member (e.g., third side member 233 in FIG. 2A) surrounding a third space (e.g., third space 2301 in FIG. 6) between the fifth surface and the sixth surface, wherein the first housing structure and the second housing structure may be connected through the first hinge structure and the third housing structure may be connected to the second housing structure through the second hinge structure, wherein, through the first hinge structure, the second surface may face the fourth surface in a folded state and the first surface and the third surface may face in the same direction in an unfolded state, and wherein, through the second hinge structure, the third surface may face the fifth surface in the folded state and the third surface and the fifth surface may face in the same direction in the unfolded state; and a flexible display (e.g., display 240 in FIG. 2A) extended from the first surface through the third surface to at least a portion of the fifth surface; wherein the second surface may include a recess (e.g., recess 218 in FIG. 2C) whose vertical distance to the first surface is at least partially shorter than that of a nearby site, and wherein the fourth surface may include a portion (e.g., portion 228 in FIG. 2C) corresponding to the recess to make surface contact with the second surface.

In various embodiments, the recess may include a first portion (e.g., first portion 2181 in FIG. 2C) whose vertical distance gradually decreases as the distance increases from the first hinge structure.

In various embodiments, the recess may include a second portion (e.g., second portion 2182 in FIG. 2C) having a vertical distance shorter than that of a nearby site and being parallel to the first surface.

In various embodiments, the second portion may be extended from the first portion.

In various embodiments, the display may include a first display area (e.g., first display area. DA1 in FIG. 2A) facing the first surface, a second display area (e.g., second display area DA2 in FIG. 2A) facing the second surface, and a third display area (e.g., third display area DA3 in FIG. 2A) facing the third surface.

In various embodiments, when the first housing structure, the second housing structure, and the third housing structure are folded relative to each other, the first display area may be disposed parallel to the third display area.

When the first housing structure, the second housing structure, and the third housing structure are folded relative to each other, the second display area may be inclined to have a preset angle with respect to the third display area.

The shape of the recess may be determined based on an inclination angle (e.g., inclination angle θ in FIG. 5) of the second display area with respect to the third display area when the electronic device is folded.

The sixth surface of the third housing structure may at least partially include an inclined surface (e.g., inclined surface 2321 in FIG. 8A) whose vertical distance to the fifth surface gradually decreases as the distance increases from the second hinge structure.

When the first housing structure, the second housing structure, and the third housing structure are folded relative to each other, the second display area and the third display area may be arranged substantially parallel to each other, and the first display area may be inclined with respect to the second display area.

The inclination angle (e.g., inclination angle θ in FIG. 5) of the first display area may be determined based on the inclination angle of the inclined surface formed on the sixth surface.

The third housing structure may include at least one support piece (e.g., support piece 235 in FIG. 8A) disposed in the third space and selectively protruding outward through the sixth surface in the unfolded state, and the protrusion of the support piece may compensate for the vertical distance reduced by the inclined surface.

The electronic device may further include at least one processor (e.g., processor 120 in FIG. 1) configured to detect a first folded state where the first housing structure and the second housing structure are folded or a second folded state where the first housing structure, the second housing structure and the third housing structure are folded relative to each other, and control the display based on the detection result.

Upon detecting the first folded state (e.g., folded state shown in FIG. 3), the processor may be configured to control the display to activate the second display area and the third display area.

Upon detecting the second folded state (e.g., folded state shown in FIG. 4), the processor may be configured to control the display to activate the first display area, deactivate the second display area and the third display area.

Upon detecting the first folded state and/or the second folded state, the processor may be configured to control the display to output at least one piece of content with a resolution corresponding to at least one display area activated based on the detected folded state.

The electronic device may include at least one electronic component disposed in the first space, and the electronic component may be disposed at a site where the vertical distance between the first surface and the second surface is the longest in the first space except for a vertical distance of the recess.

The at least one electronic component may include at least one camera module (e.g., camera module 214 in FIG. 2A) or at least one sensor module (e.g., sensor module 215 in FIG. 2A) being exposed through at least a portion of the display or sensing an external environment through the display.

The electronic device may include a printed circuit board (e.g., printed circuit board 253 in FIG. 6) disposed in the second space, and the printed circuit board may be electrically connected through an electrical connection member to at least one first electronic component arranged in the first space and at least one second electronic component arranged in the third space.

The at least one second electronic component may include at least one battery (e.g., first battery 255 in FIG. 6) and/or at least one speaker module (e.g., second speaker module 257 in FIG. 6).

According to an embodiment, an electronic device (e.g., electronic device 200 in FIG. 2A) may include: a foldable housing that includes: a multi-joint hinge structure being out-foldable (e.g., first hinge structure 261 in FIG. 2A); a two-axis hinge structure being in-foldable (e.g., second hinge structure 262 in FIG. 2A); a first housing structure (e.g., first housing structure 210 in FIG. 2A) including a first surface (e.g., first surface 211 in FIG. 2A), a second surface (e.g., second surface 212 in FIG. 2A) facing away from the first surface, and a first side member (e.g., first side member 213 in FIG. 2A) surrounding a first space (e.g., first space 2101 in FIG. 6) between the first surface and the second surface; a second housing structure (e.g., second housing structure 220 in FIG. 2A) including a third surface (e.g., third surface 221 in FIG. 2A), a fourth surface (e.g., fourth surface 222 in FIG. 2A) facing away from the third surface, and a second side member (e.g., second side member 223 in FIG. 2A) surrounding a second space (e.g., second space 2201 in FIG. 6) between the third surface and the fourth surface; and a third housing structure (e.g., third housing structure 230 in FIG. 2A) including a fifth surface (e.g., fifth surface 231 in FIG. 2A), a sixth surface (e.g., sixth surface 232 in FIG. 2A) facing away from the fifth surface, and a third side member (e.g., third side member 233 in FIG. 2A) surrounding a third space (e.g., third space 2301 in FIG. 6) between the fifth surface and the sixth surface, wherein the first housing structure and the second housing structure may be connected through the multi-joint hinge structure and the third housing structure may be connected to the second housing structure through the two-axis hinge structure, wherein through the multi-joint hinge structure, the second surface may face the fourth surface in a folded state and the first surface and the third surface may face in the same direction in an unfolded state, and wherein through the two-axis hinge structure, the third surface may face the fifth surface in the folded state and the third surface and the fifth surface may face in the same direction in the unfolded state; and a flexible display (e.g., display 240 in FIG. 2A) extended from the first surface through the third surface to at least a portion of the fifth surface, wherein when both the multi-joint hinge structure and the two-axis hinge structure are folded, the first surface and the sixth surface may be exposed to outside the electronic device; the first surface, the fifth surface and the sixth surface may be arranged parallel to each other, and the first surface and the third surface may be arranged not to be parallel to each other.

The first housing structure may further include a recess formed on the second surface to receive at least a portion of the two-axis hinge structure in the folded state.

The curvature of the region of the display folded through the multi-joint hinge structure may be greater than the curvature of the region of the display folded through the two-axis hinge structure.

The second surface may include a recess whose vertical distance to the first surface is at least partially shorter than that of a nearby site, and the fourth surface may include a portion corresponding to the recess to make surface contact with the second surface.

The recess may be formed such that the vertical distance gradually decreases as the distance from the multi-joint hinge structure increases.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a foldable housing that includes:
      a first hinge structure;
      a second hinge structure;
      a first housing structure including a first surface, a second surface facing away from the first surface, and a first side member surrounding a first space between the first surface and the second surface;
      a second housing structure including a third surface, a fourth surface facing away from the third surface, and a second side member surrounding a second space between the third surface and the fourth surface; and
      a third housing structure including a fifth surface, a sixth surface facing away from the fifth surface, and a third side member surrounding a third space between the fifth surface and the sixth surface,
      wherein the first housing structure and the second housing structure are connected through the first hinge structure and the third housing structure is connected to the second housing structure through the second hinge structure,
      wherein, through the first hinge structure, the second surface faces the fourth surface in a folded state and the first surface and the third surface face in the same direction in an unfolded state, and
      wherein, through the second hinge structure, the third surface faces the fifth surface in the folded state and the third surface and the fifth surface face in the same direction in the unfolded state; and
   a flexible display extended from the first surface through the third surface to at least a portion of the fifth surface,
   wherein the second surface includes a first recess whose vertical distance to the first surface is at least partially shorter than a vertical distance of a nearby site, and
   wherein the fourth surface includes a portion corresponding to the recess to make surface contact with the second surface.

2. The electronic device of claim 1, wherein the recess includes a first portion whose vertical distance gradually decreases as a distance from the first hinge structure increases.

3. The electronic device of claim 2, wherein the recess includes a second portion having a vertical distance shorter than the vertical distance of the nearby site and being parallel to the first surface.

4. The electronic device of claim 3, wherein the second portion extends from the first portion.

5. The electronic device of claim 1, wherein the display includes a first display area facing the first surface, a second display area facing the second surface, and a third display area facing the third surface.

6. The electronic device of claim 5, wherein when the first housing structure, the second housing structure, and the third housing structure are folded relative to each other, the first display area is disposed parallel to the third display area.

7. The electronic device of claim 6, wherein when the first housing structure, the second housing structure, and the third housing structure are folded relative to each other, the second display area is inclined to have a preset angle with respect to the third display area.

8. The electronic device of claim 7, wherein the shape of the recess is determined based on an inclination angle of the second display area with respect to the third display area when the electronic device is folded.

9. The electronic device of claim 5, wherein the sixth surface of the third housing structure includes an inclined surface whose vertical distance to the fifth surface gradually decreases as a distance from the second hinge structure increases at least partially.

10. The electronic device of claim 9, wherein when the first housing structure, the second housing structure, and the third housing structure are folded relative to each other, the second display area and the third display area are arranged substantially parallel to each other, and the first display area is inclined with respect to the second display area.

11. The electronic device of claim 10, wherein an inclination angle of the first display area is determined based on an inclination angle of the inclined surface formed on the sixth surface.

12. The electronic device of claim 9, wherein the third housing structure includes at least one support piece disposed in the third space and selectively protruding outward through the sixth surface in the unfolded state, and wherein the protrusion of the at least one support piece is formed to compensate for the vertical distance reduced by the inclined surface.

13. The electronic device of claim 9, further comprising at least one processor configured to:
  detect a first folded state where the first housing structure and the second housing structure are folded or a second folded state where the first housing structure, the second housing structure and the third housing structure are folded relative to each other, and
  control the display based on a result of the detecting of the first folded state.

14. The electronic device of claim 13, wherein upon detecting the first folded state, the processor is further configured to control the display to activate the second display area and the third display area.

15. The electronic device of claim 13, wherein upon detecting the second folded state, the processor is further configured to control the display to activate the first display area and to deactivate the second display area and the third display area.

16. The electronic device of claim 13, wherein upon detecting at least one of the first folded state or the second folded state, the processor is further configured to control the display to output at least one piece of content with a resolution corresponding to at least one display area activated based on the detected folded state.

17. The electronic device of claim 1, further comprising at least one electronic component disposed in the first space, and the electronic component is disposed at a site where a vertical distance between the first surface and the second surface is a longest vertical distance in the first space except for the vertical distance of the recess.

18. The electronic device of claim 17, wherein the at least one electronic component includes at least one camera module exposed through at least a portion of the display or at least one sensor module sensing an external environment through the display.

19. The electronic device of claim 1, further comprising a printed circuit board disposed in the second space, wherein the printed circuit board is electrically connected through an electronic connection member to at least one first electronic component arranged in the first space and at least one second electronic component arranged in the third space.

20. The electronic device of claim 19, wherein the at least one second electronic component includes at least one battery or at least one speaker module.

21. An electronic device comprising a foldable housing that includes:
  a multi-joint hinge structure being outwardly foldable;
  a two-axis hinge structure being inwardly foldable;
  a first housing structure including a first surface, a second surface facing away from the first surface, and a first side member surrounding a first space between the first surface and the second surface;
  a second housing structure including a third surface, a fourth surface facing away from the third surface, and a second side member surrounding a second space between the third surface and the fourth surface;
  a third housing structure including a fifth surface, a sixth surface facing away from the fifth surface, and a third side member surrounding a third space between the fifth surface and the sixth surface,
  wherein the first housing structure and the second housing structure are connected through the multi-joint hinge structure and the third housing structure is connected to the second housing structure through the two-axis hinge structure,
  wherein, through the multi-joint hinge structure, the second surface faces the fourth surface in a folded state and the first surface and the third surface face in the same direction in an unfolded state, and
  wherein, through the two-axis hinge structure, the third surface faces the fifth surface in the folded state and the third surface and the fifth surface face in the same direction in the unfolded state; and
  a flexible display extended from the first surface through the third surface to at least a portion of the fifth surface,
  wherein when both the multi joint hinge structure and the two-axis hinge structure are folded, the first surface and the sixth surface are exposed to outside the electronic device, the first surface, the fifth surface and the sixth surface are arranged parallel to each other, and the first surface and the third surface are arranged not to be parallel to each other.

22. The electronic device of claim 21, wherein the first housing structure further includes a recess formed on the second surface to accommodate at least a portion of the two-axis hinge structure in the folded state.

23. The electronic device of claim 21, wherein a curvature of a region of the display folded through the multi-joint hinge structure is greater than a curvature of a region of the display folded through the two-axis hinge structure.

24. The electronic device of claim 21, wherein the second surface includes a recess whose vertical distance to the first surface is at least partially shorter than a vertical distance of a nearby site; and
  the fourth surface includes a portion corresponding to the recess to make surface contact with the second surface.

25. The electronic device of claim 24, wherein the recess is formed such that the vertical distance gradually decreases as a distance from the multi-joint hinge structure increases.

* * * * *